Nov. 14, 1967    J. C. FULLER ET AL    3,352,013
APPARATUS FOR VENTING PNEUMATIC TIRES
Filed March 15, 1965    2 Sheets-Sheet 2
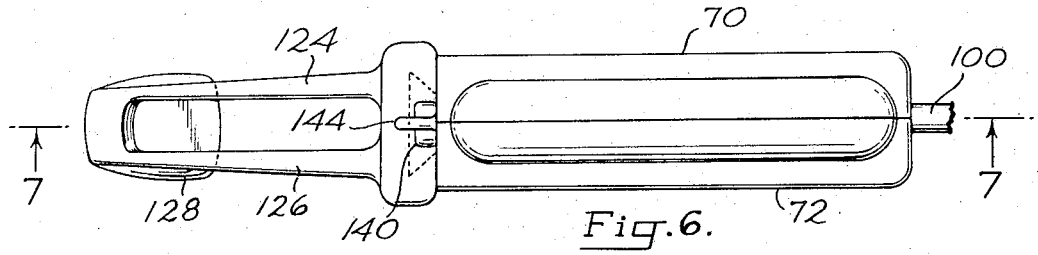
Fig. 6.
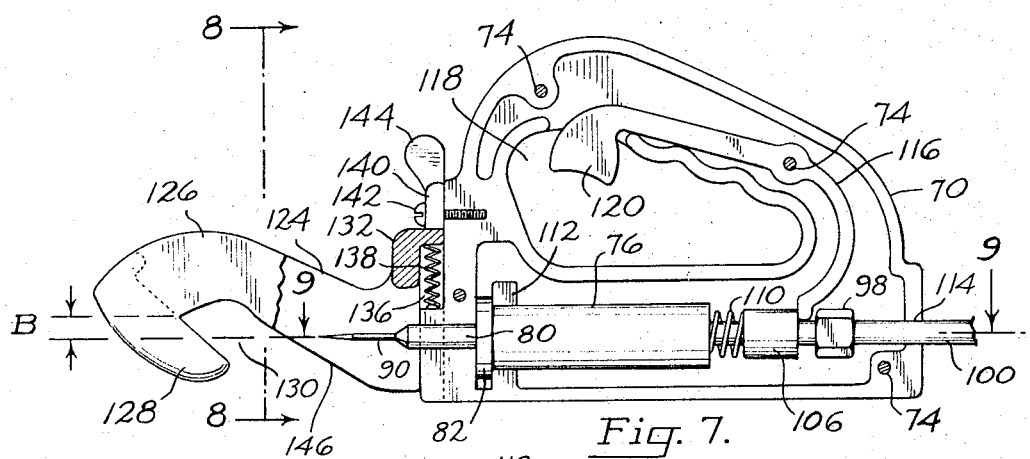
Fig. 7.
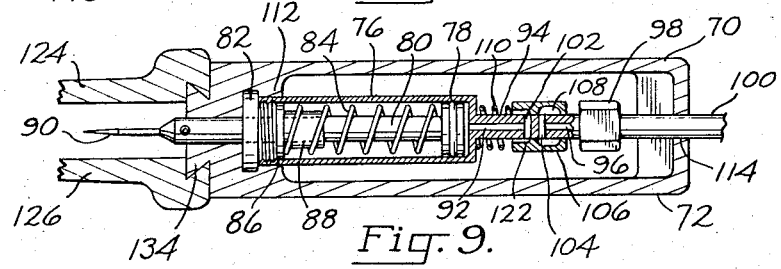
Fig. 9.
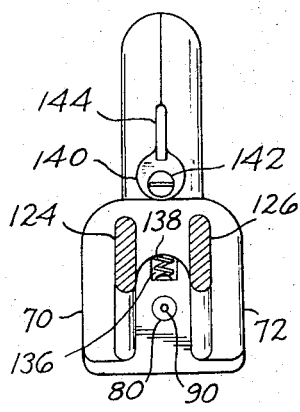
Fig. 8.
John C. Fuller
Gordon W. Fuller
Ralph A. Fuller
William I. Fuller
INVENTORS
BY 
Agent United States Patent Office 3,352,013
Patented Nov. 14, 1967

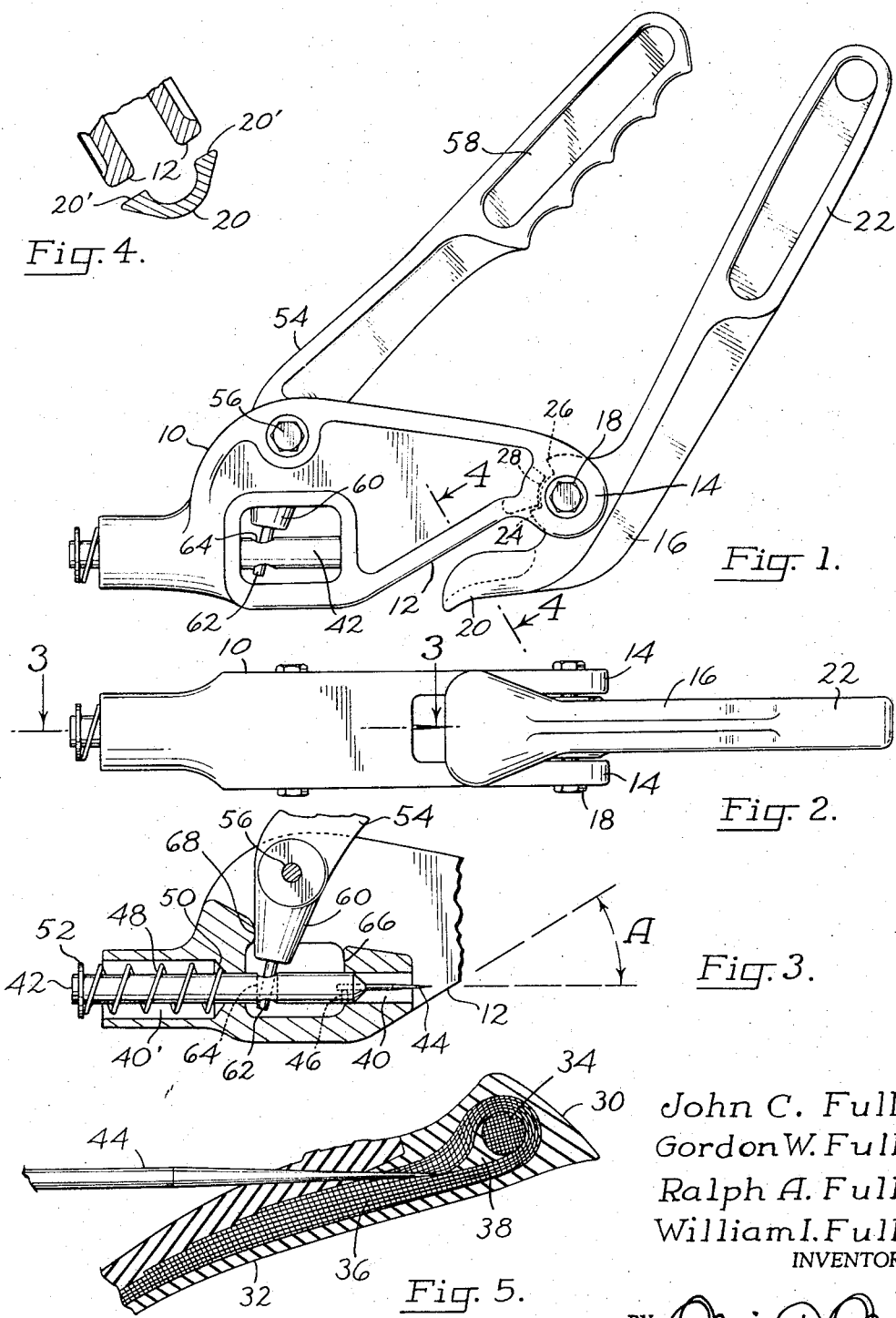

3,352,013
APPARATUS FOR VENTING PNEUMATIC TIRES
John C. Fuller, 5221 SE. Naef Road, Milwaukie, Oreg. 97222, Gordon W. Fuller, 7320 SW. Landau St., Portland, Oreg. 97223, Ralph A. Fuller, 12220 SW. Grant, Tigard, Oreg. 97221, and William I. Fuller, P.O. Box 123, Wilsonville, Oreg. 97070
Filed Mar. 15, 1965, Ser. No. 439,875
5 Claims. (Cl. 30—368)

This invention relates to the external venting of pneumatic tires for the purpose of relieving internal air pressure within the cord body, and more particularly to apparatus for performing this function.

External venting of pnuematic tires has long been recognized as a necessity to relieve the substantial air pressure which may develop within the cord body of new or retread casings. It is universally recognized in the art that, in the absence of external venting, the development of internal air pressure within the cord body, often reaching magnitudes in excess of twenty p.s.i., is a major cause of ply and top ply separations.

It has been the general practice heretofore to effect external venting of tires by one of two manual procedures. One of these is the manual manipulation of a power driven drill by which a plurality of holes are drilled into the tire adjacent the bead to a depth sufficient to penetrate the cords. It has been found, however, that even if this procedure is accomplished with sufficient skill to reach the proper depth of drilling, the rate of release of air pressure in insufficient to prevent ply separation. More often, on the other hand, this procedure results either in the drilling of holes of insufficient depth to penetrate cords, or of such greater depth as to penetrate the inner liner and cause break out.

The second manual procedure employed heretofore has been the manual manipulation of an awl or ice pick, directed to enter the outside of the tire sufficiently above the heel of the bead so as to clear the lip of the wheel rim upon mounting of the tire, and then projected angularly inward to the central portion of the bead area where the plies wrap around the bead.

It has been found that as air enters the cord body it travels to the bead area and then redistributes throughout the casing, and thus the venting of the bead area is most effective in relieving air pressure within the cord body. Moreover, it has been found that the use of an awl or ice pick, as compared with a drill, provides much faster release of air pressure. However, this manual procedure presents the same problem as drill venting insofar as the inability to obtain consistent depth of penetration and proper termination in the bead area. A second difficulty with this procedure arises from the fact that the tire casings tends to collapse during penetration of the awl, thus magnifying the difficulty of obtaining proper direction and depth of penetration.

Accordingly, it is the principal object of the present invention to provide apparatus by which to effect the external venting of pneumatic tires consistently to precise depth and to the proper area adjacent the bead.

Another important object of this invention is the provision of apparatus for venting pneumatic tires, which apparatus is small in size and light in weight, and thus is readily portable for use.

Still another important object of the present invention is the provision of apparatus by which to effect the external venting of pneumatic tires with speed and facility.

A further important object of this invention is the provion of apparatus for venting pneumatic tires, which apparatus is of simplified construction for economical manufacture and which is capable of long service life with minimum maintenance and repair.

The foregoing and other objects and advantages of this invention will appear from the following detailed description, taken in connection with the accompanying drawings in which:

FIG. 1 is a view in side elevation of a manually operable tire venting apparatus embodying the features of the present invention;

FIG. 2 is a bottom view of the apparatus shown in FIG. 1;

FIG. 3 is a fragmentary sectional view taken on the line 3—3 on FIG. 2 and showing details of the manual drive connection to the tire piercing component;

FIG. 4 is a fragmentary sectional view taken on the line 4—4 in FIG. 1 and showing details of construction of the tire supporting head portion of the apparatus;

FIG. 5 is a fragmentary sectional view of a conventional four ply pneumatic tire showing the preferred angle and depth of penetration of the piercing component of the apparatus;

FIG. 6 is a bottom plan view of a penumatically powered tire venting apparatus embodying the feature of the present invention;

FIG. 7 is a longitudinal sectional view, taken on the line 7—7 in FIG. 6 and showing details of internal construction of the pneumatically powered apparatus;

FIG. 8 is a sectional view taken on the line 8—8 in FIG. 7 and showing the manner in which the head portion of the apparatus body is adjustable relative to the tire piercing component; and FIG. 9 is a fragmentary sectional view taken on the line 9—9 in FIG. 7 and showing details of internal construction of the pneumatic power component of the apparatus.

In its basic concept, the apparatus of the present invention includes a body having a head portion defining a recess adapted to receive therein the bead portion of a tire, an elongated tire piercing member mounted on the body for movement to penetrate the tire inwardly from the outer side thereof to an internal position adjacent the bead, and manual or power driven means on the body engaging the piercing member for moving the latter.

Referring first to the embodiment illustrated in FIGS. 1-4, the body 10 is provided with a head portion which includes the laterally spaced tire abutting surfaces 12, the laterally spaced tabs 14 at the outer ends of said surfaces, and the tire clamping lever 16 mounted between said tabs on the pivot pin 18. The lever includes a tire gripping jaw portion 20 disposed adjacent the tire abutting surfaces 12 and movable toward and away from the latter for releasably gripping a tire therebetween. The opposite end of the lever provides a handle portion 22 by which to effect its pivotal movement.

The intermediate portion of the lever 16 through which the pivot pin 18 extends is provided with a pair of projecting lugs 24 and 26, spaced circumferentially with respect to the pivot pin 18 and receiving between them a projecting portion 28 of the body. The lugs function by abutment with the projecting portion of the body to limit the pivotal movement of the lever, and thus the degree of movement of the jaw 20 toward and away from the tire abutting surfaces 12.

The tire abutting surfaces 12, tabs 14 and jaw 20 thus define a recess in the substantially U-shaped head portion of the body, adapted to receive therein the bead portion of a tire. The depth of the recess is defined by the adjacent surfaces of the spaced tabs 14 which serve as abutments for the heel edge 30 of the tire 32 adjacent the bead 34 (FIG. 5). As is well known, the cord plies 36 are wrapped around the bead, defining a central area 38 adjacent the bead.

A longitudinal bore 40 in the body slidably receives therein an elongated tire piercing member. In the embodiment illustrated, this member includes an elongated rod 42 provided at its forward end with a central bore in which to seat the rearward end of an elongated, forwardly pointed, tire piercing needle 44. The needle is secured removably to the rod by such means as the set screw 46.

The rearward portion 40′ of the longitudinal bore is enlarged sufficiently to receive the coil spring 48 which encircles the rearward portion of the rod. The forward end of the spring abuts against the shoulder 50 formed at the forward end of the enlarged portion of the bore, and the rearward end of the spring abuts against a collar 52 mounted on the rod adjacent the rearward end thereof. Conveniently, this collar may be provided in the form of a standard snap ring which is removably seated in an angular groove in the rod. The spring thus urges the rod and the attached needle normally to a position of rearward retraction.

Means is provided for moving the rod and needle assembly in a forward direction, for piercing a tire. In the embodiment illustrated, this means includes an operating lever 54 mounted pivotally intermediate its ends between laterally spaced portions of the body 10, on the pivot pin 56. The outer portion of the operating lever forms a handle 58, and the inner portion 60 of the lever projects inwardly toward the rod 42 and terminates adjacent the latter. A central bore in this inner portion of the operating lever secures a connector pin 62 therein. This pin projects from the lever through a slot 64 which extends diametrically through an intermediate portion of the rod.

Thus, by pivoting the operating lever in the counterclockwise direction in FIGS. 1 and 3, the connector pin engages the rod at the forward end of the slot and then moves the rod and needle toward the right, in the forward, tire piercing direction. The limit of this counterclockwise rotation is established by abutment of the inner end of the lever with the stop 66 formed by a transverse section of the body in which the forward portion of the longitudinal bore 40 is defined.

The limit of counterclockwise rotation of the operating lever, by abutment of the inner end of the lever with the stop 66, is arranged to provide for forward extension of the point of the needle, forwardly across the tire abutting surfaces 12 of the head portion to a predetermined distance rearwardly from the tire abutting surfaces of the tabs 14, to insure that the needle has penetrated to the central portion 38 of the tire adjacent the bead 34, as clearly illustrated in FIG. 5.

Although a fixed stop is provided for this purpose in the embodiment illustrated, it will be apparent that a longitudinally adjustable stop may readily be provided by such means as a threaded adjustment screw extending through a longitudinal threaded hole in the transverse section forming the stop 66, with the rearward end of the screw disposed for abutment by the inner end 60 of the operating lever. Many other structural arrangements also may be employed to provide an adjustable stop by which to vary the limit of forward extension of the needle, as will be apparent.

It is to be noted that the longitudinal axis of movement of the needle 44 across the tire abutting surfaces 12 of the head portion of the body forms with said surfaces an included angle A. This angle is sufficiently acute, and preferably about 32°, to insure that the needle will enter the outer surface of the tire in an area which is above the rim of a wheel when the tire is mounted, and then extends into the tire, terminating in the central portion 38 thereof adjacent the bead.

In the preferred embodiment illustrated, the surface of the jaw portion 20 of the clamping lever facing the tire abutting surfaces 12 is concaved centrally to provide laterally spaced tire engaging surfaces 20′ substantially aligned with the laterally spaced tire abutting surfaces 12. The hollow central portion of the jaw thus permits a degree of deflection of a tire in that area. In this regard it has been found that this limited degree of deflection of the tire contributes to better penetration of the needle and substantially eliminates bending of the needle.

The extent of clockwise pivotal movement of the operating lever 54 is defined by abutment of the inner portion of the lever with a stop 68 formed by a second transverse section of the body in which the rearward portion 40′ of the longitudinal bore is defined. The position of this stop is arranged to insure retraction of the point of the needle rearwardly behind the tire abutting surfaces 12 of the head portion of the body, as illustrated in FIG. 3.

In use, the apparatus described hereinbefore is taken up in the hands, one hand on the handle 22 of the clamping lever 16 and the other hand on the handle 58 of the operating lever 54. The clamping lever is pivoted counterclockwise to the position of maximum opening of the recess in the head portion of the body. The bead portion of the tire then is inserted into the recess until the heel edge 30 of the tire abuts against the laterally spaced tabs 14. Then by forcing the lever handles apart simultaneously by rotating the clamping lever 16 clockwise and the operating lever 54 counterclockwise, the clamping lever jaw 20 is moved to constrict the recess and thus clamp the bead portion of the tire firmly between the surfaces 12 and 20′, while the needle 44 is moved forward, penetrating the outer surface of the tire in the area above the wheel rim. When the operating lever has been moved to its extreme limit of counterclockwise rotation, into abutment of the inner end 60 of the lever with the stop 66, the forward tip of the needle has penetrated to the central portion 38 of the tire adjacent the bead 34. Thus, upon retraction of the needle, by counterclockwise pivoting of the operator lever with the aid of the spring 48, there is provided in the tire an opening which extends outwardly from the central portion of the tire adjacent the bead to the outer surface of the tire outward of the wheel rim.

A plurality of such openings are provided at circumferentially spaced intervals around the tire, to insure adequate venting of air from the cord body.

Referring now to the embodiment illustrated in FIGS. 6-9, the body is provided in two longitudinal halves 70 and 72 secured together removably by such means as the screws 74. Registering hollow portions within the body halves removably receive an elongated pneumatic piston-cylinder unit illustrated in detail in FIG. 9. The hollow cylinder 76 confines a piston 78 slidably therein, and the piston rod 80 extends forwardly through the removably cap 82 which closes the front end of the cylinder. A coil spring 84 encircles the piston rod within the cylinder, and abuts at the rearward end against the piston and at the forward end against the enlarged collar 86 at the forward end of the abutment sleeve 88 which freely encircles the piston rod. The length of this sleeve is chosen such that when the piston has moved toward the left in FIG. 9 into abutment with the sleeve, the pointed tip of the needle 90 carried at the outer end of the piston rod, will have penetrated the tire to the proper depth, namely to the central portion 38 adjacent the bead 34, as illustrated in FIG. 5.

The rearward end of the cylinder communicates with the outlet opening 92 in the adjustable valve body 94. The inlet opening 96 is connected through the coupling 88 to a conduit 100 which is adapted for connection to a source of air under pressure.

The valve, of conventional type, includes a pair of longitudinally spaced transverse openings 102 and 104. Opening 102 communicates with the outlet opening 92 and opening 104 communicates with the inlet opening 96. Surrounding these transverse openings and slidable longitudinally relative to the valve body 94 is an adjustment sleeve 106. A portion of the length of the sleeve is provided with an annular chamber 108 having a length sufficient to span both of the transverse openings 102 and 104. A coil spring 110 is interposed between the rearward end of the cylinder 76 and the forward end of the sleeve 106, normally to urge the latter to its rearward position at which it seals the inlet opening 96 from the outlet opening 92.

The foregoing piston-cylinder unit is supported within the body against lateral and longitudinal displacement. In the embodiment illustrated, this is achieved by the provision in each of the body halves of a semicircular flange 112 which cooperate to receive between them the forward end of the cylinder 76, with the head of cap 82 confined between the lugs and the forward wall of the body. The conduit 100 extends rearwardly through registering semi-circular notches 114 in the two body halves.

An operating lever 116 is housed within the hollow body halves and is mounted pivotally intermediate its ends on one of the connecting screws 74. The rearward end of the operating lever abuts the rearward end of the valve sleeve 106, and the forward end of the operating lever projects into a central transverse opening 118 in each of the body halves. This opening serves to receive the fingers of a hand, with the portion of the body above it forming a hand grip. The forward projecting portion of the lever thus forms a finger trigger 120 which, when moved upward, effects clockwise pivoting of the lever 116. By this movement of the lever, its rearward end is caused to move forward, pushing the valve sleeve 106 forwardly, against the resistance of the spring 110, to the position at which the annular chamber 108 in the valve sleeve spans both of the transverse openings 102 and 104. Air under pressure thus is communicated through the valve to the rearward side of the piston 78 within the cylinder, forcing the piston forward against the resistance of the coil spring 84, until it abuts the sleeve 88.

Upon release of the finger trigger 120, the coil spring 110 urges the sleeve rearward, pivoting the operating lever 116 counterclockwise and returning the sleeve to the position illustrated in FIG. 9. In this position an opening 122 in the sleeve registers with the transverse opening 102, thereby communicating the rearward end of the cylinder 76 to the atmosphere and permitting the piston 78 to be retracted rearwardly under the influence of the coil spring 84.

The substantially U-shaped head portion of the body is provided, in the embodiment illustrated, as a removable section. It includes a pair of laterally spaced, elongated fingers 124 and 126 the outer ends of which are offset downwardly and there joined to a jaw member 128. This jaw member projects rearward from the fingers to define a recess 130 therebetween for freely receiving the bead portion of a tire 32 and confining it against lateral displacement.

The rearward ends of the fingers are interconnected by the upper transverse wall 132, and below this wall the rearward ends of the fingers are notched vertically to form a dove tail slot adapted to slidably receive the complementary dove tail tongue 134 formed as matching halves on the forward ends of the main body halves.

The upper transverse wall 132 extends rearwardly over the upper end of the dove tail tongue, to limit the downward displacement of the head protion relative to the main body. A vertical opening 136 in the dove tail tongue freely receives therein the coil spring 138 which abuts at its bottom end against the bottom of the opening and at its top end against the transverse wall 132. The spring thus urges the head portion upwardly relative to the main body.

Means is provided, in the embodiment illustrated, for adjusting the head portion vertically relative to the main body, between maximum desired limits. An eccentric cam 140 is secured rotatably to the main body, by means of the mounting screw 142, with the eccentric cam resting in abutment with the upper surface of the transverse wall 132. A finger tab 144 is provided on the cam to facilitate its rotational adjustment. Thus, with the cam disposed in the position illustrated in FIGS. 7 and 8, the head portion of the body is adjusted to its position of maximum upward displacement relative to the main body, being supported in that position by the spring 138. By rotating the cam clockwise or counterclockwise from the position shown in FIG. 8, through approximately 90°, the eccentric cam forces the head portion downward, against the resistance of the spring 138, to its position of maximum downward movement relative to the main body.

The purpose of the vertical adjustment of the head portion relative to the main body, is to provide a variation in the vertical distance B (FIG. 7) between the longitudinal axis of the tire penetrating needle 90 and the closed end of the recess 130. This has been found desirable in order to effect proper venting of tires of diverse profiles.

As in the embodiment first illustrated and described, the surfaces 146 of the fingers 124, 126 facing the jaw 128 serve to abut against the outer surface of a tire. These surfaces of the fingers form with the longitudinal axis of movement of the needle and included acute angle A, preperably about 32°, as previously explained. It will be noted that this angle is maintained substantially constant throughout the range of vertical movement of the head portion relative to the main body.

In use, the hand grip portion of the main body is taken into the hand, and the apparatus manipulated to draw the bead portion of a tire into the recess 130 defined between the fingers 124, 126 and jaw 128 of the head portion. The index finger of the hand then is placed on the trigger 120 of the operating lever 116 and squeezed, rotating the operating lever clockwise to admit air under pressure to the rearward side of the piston 78. The latter thus is projected forward rapidly to cause the needle 90 to penetrate the tire angularly, in the manner previously explained. Upon release of the trigger the valve sleeve 106 is retracted rearwardly to the position illustrated in FIG. 9, communicating the rearward end of the cylinder to the atmosphere and allowing the coil spring 84 to retract the piston and pull the needle from the tire.

Thus, it will be apparent from the foregoing that the present invention provides simplified, light weight apparatus by which to effect the external venting of pneumatic tires with speed, facility and precision. By virtue of the fixed angular relationship between the axis of movement of the tire piercing needle and the tire abutting surface of the head portion, the angle and depth of penetration of the needle into the tire is rendered consistently uniform. This consistency is achieved in the hand operated embodiment illustrated in FIGS. 1–4, regardless of the variations in tire profile, by virtue of the clamping action of the movable jaw 20. In the power operated embodiment illustrated in FIGS. 6–9, the consistency of depth and area of penetration is achieved by virtue of the adjustability of the head portion relative to the body, to effect variations in the distance B.

It will be apparent to those skilled in the art that various changes may be made in the structural details described hereinbefore without departing from the spirit of this invention and the scope of the appended claims.

Having now described our invention and the manner in which it may be used, what we claim as new and desire to secure by Letters Patent is:

1. Apparatus for venting pneumatic tires, comprising
   (a) a body having a substantially U-shaped head portion defining a recess adapted to confine therein the bead portion of a tire,
   (b) the recess being defined in part by a bearing surface of the head portion adapted to abut against the outer surface of a tire,
   (c) an elongated tire piercing member mounted on the body, said piercing member being movable across the plane of said bearing surface on an axis defining with said bearing surface an included angle of about 32° between a retracted position behind said recess and a tire piercing position into and toward the base of said recess for penetrating a tire inwardly from the outer side thereof outward of the wheel rim portion of the tire angularly to an internal position adjacent the bead of the tire, and (d) drive means on the body engaging the piercing member for moving the latter.

2. Apparatus for venting pneumatic tires, comprising
(a) a body having a head portion defining a recess adapted to receive therein the bead portion of a tire,
(b) the recess being defined in part by a bearing surface of the head portion adapted to abut against the outer surface of a tire,
(c) the head portion of the body including an elongated lever pivoted intermediate its ends on the body,
(d) one end portion of the lever being disposed adjacent said recess-defining bearing surface for movement toward and away from the latter for releasably gripping the bead portion of a tire therebetween,
(e) an elongated tire piercing member mounted on the body, said piercing member being movable across the plane of said bearing surface between a retracted position behind said recess and a tire piercing position into said recess for penetrating a tire inwardly from the outer side thereof to an internal position adjacent the bead of the tire, and
(f) drive lever means pivoted intermediate its ends on the body,
(g) one end of the drive lever member engaging the tire piercing member for moving the latter upon pivotal movement of the drive lever member.

3. The apparatus of claim 2 wherein the bearing surface of the head portion defines with the axis of movement of the tire piercing member an included angle of about 32°.

4. Apparatus for venting pneumatic tires, comprising
(a) a body having a head portion defining a recess adapted to receive therein the bead portion of a tire,
(b) the recess being defined in part by a bearing surface of the head portion adapted to abut against the outer surface of a tire,
(c) an elongated tire piercing member mounted on the body, said piercing member being movable across the plane of said bearing surface between a retracted position behind said recess and a tire piercing position into said recess for penetrating a tire inwardly from the outer side thereof to an internal position adjacent the bead of the tire, and (d) drive means on the body engaging the piercing member for moving the latter,
(e) the head portion of the body including an elongated lever pivoted intermediate its ends on the body,
(f) one end portion of the lever being disposed adjacent said recess-defining bearing surface for movement toward and away from the latter for releasably gripping the bead portion of a tire therebetween 5. Apparatus for venting pneumatic tires, comprising
(a) a body having a substantially U-shaped head portion defining a recess adapted to confine therein the bead portion of a tire,
(b) the recess being defined in part by a bearing surface of the head portion adapted to abut against the outer surface of a tire,
(e) an elongated tire piercing member mounted on the body, said piercing member being movable across the plane of said bearing surface angularly between a retracted position behind said recess and a tire piercing position into and toward the base of said recess for penetrating a tire inwardly from the outer side thereof outward of the wheel rim portion of the tire angularly to an internal position adjacent the bead of the tire,
(d) drive means on the body engaging the piercing member for moving the latter,
(e) the head portion being separate from the body, and
(f) relatively movable connecting means interengaging the body and head portion for adjustably moving the head portion substantially normal to the axis of movement of the tire piercing member for varying the distance between the base of the recess and the axis of movement of the piercing member.

References Cited

UNITED STATES PATENTS

| | | | |
|---|---|---|---|
| 562,981 | 6/1896 | Sprinkle | 30—363 |
| 1,440,082 | 12/1922 | Inslee | 83—639 |
| 2,591,409 | 4/1952 | Dahl. | |
| 3,093,023 | 6/1963 | Vail | 83—464 X |
| 3,095,773 | 7/1963 | Hurst et al. | 83—2 |
| 3,107,565 | 10/1963 | Hermans | 83—2 |
| 3,109,337 | 11/1963 | Wise | 83—2 |
| 3,124,978 | 3/1964 | Barns et al. | 83—2 |

WILLIAM FELDMAN, *Primary Examiner.*

G. WIEDENFELD, *Assistant Examiner.*